United States Patent
Chung et al.

(10) Patent No.: US 10,358,731 B2
(45) Date of Patent: Jul. 23, 2019

(54) METAL CATALYST, METHOD FOR MANUFACTURING THE METAL CATALYST AND ELECTROCHEMICAL REDUCTION METHOD

(71) Applicant: Seoul National University R&DB Foundation, Seoul (KR)

(72) Inventors: Taekdong Chung, Gwacheon-si (KR); Jinyoung Lee, Yongin-si (KR)

(73) Assignee: Seoul National University R&DB Foundation (KR)

(*) Notice: Subject to any disclaimer, the term of this patent is extended or adjusted under 35 U.S.C. 154(b) by 219 days.

(21) Appl. No.: 15/360,991

(22) Filed: Nov. 23, 2016

(65) Prior Publication Data
US 2017/0073828 A1    Mar. 16, 2017

Related U.S. Application Data

(62) Division of application No. 13/970,499, filed on Aug. 19, 2013, now abandoned.

(30) Foreign Application Priority Data

Apr. 3, 2013  (KR) .................. 10-2013-0036101

(51) Int. Cl.
| | | |
|---|---|---|
| *C25C 7/02* | (2006.01) | |
| *C25C 1/20* | (2006.01) | |
| *B01J 37/34* | (2006.01) | |
| *B01J 23/89* | (2006.01) | |
| *B01J 23/42* | (2006.01) | |

(Continued)

(52) U.S. Cl.
CPC .................. *C25C 1/20* (2013.01); *B01J 23/42* (2013.01); *B01J 23/44* (2013.01); *B01J 23/52* (2013.01); *B01J 23/72* (2013.01); *B01J 23/75* (2013.01); *B01J 23/8926* (2013.01); *B01J 35/002* (2013.01); *B01J 35/006* (2013.01);
(Continued)

(58) Field of Classification Search
None
See application file for complete search history.

(56) References Cited

U.S. PATENT DOCUMENTS

2013/0109577 A1*  5/2013  Korlach ............. G01N 27/3278
                                                                506/4

FOREIGN PATENT DOCUMENTS

| CN | 101250711 A | 8/2008 |
| JP | 2004131806 A | 4/2004 |

OTHER PUBLICATIONS

Edwards, Jennifer K., et al. "Au—Pd supported nanocrystals as catalysts for the direct synthesis of hydrogen peroxide from H2 and O2," The Royal Society of Chemistry 2008, Green Chem., 2008, 10, 388-394, Nov. 20, 2007.

* cited by examiner

*Primary Examiner* — Salil Jain
(74) *Attorney, Agent, or Firm* — Renaissance IP Law Group LLP (57) ABSTRACT

This invention relates to a metal catalyst, a manufacturing method of the metal catalyst, and an electrochemical reduction method.
The metal catalyst is manufactured by a method comprising providing a conductor to one side of an insulator, providing a fluid including a metal ion and an electron mediator to the other side of the insulator and providing a voltage to the conductor.
The electrochemical reduction method comprises providing a conductor to one side of an insulator, providing a fluid
(Continued)

including reduction material and an electron mediator to the other side of the insulator and providing a voltage to the conductor.

8 Claims, 9 Drawing Sheets

(51) Int. Cl.
*B01J 23/44* (2006.01)
*B01J 23/52* (2006.01)
*B01J 23/72* (2006.01)
*B01J 23/75* (2006.01)
*B01J 35/00* (2006.01)
*C25C 7/00* (2006.01)

(52) U.S. Cl.
CPC ......... *B01J 35/0013* (2013.01); *B01J 37/348* (2013.01); *C25C 7/00* (2013.01)

METAL CATALYST, METHOD FOR MANUFACTURING THE METAL CATALYST AND ELECTROCHEMICAL REDUCTION METHOD

BACKGROUND

1. Technical Field

The present disclosure relates to a metal catalyst, a manufacturing method of the metal catalyst, and an electrochemical reduction method.

2. Description of the Related Art

Metal catalysts are used in the various fields. For example, the metal catalyst can be used for a synthesis reaction or for pollutant degradation. Recently, a nano-sized metal catalyst is developed so that high selectivity can be implementable in the lower temperature with the nano-sized metal catalyst, compared to the conventional metal catalysts. However, the nano-sized metal catalyst is supported by an inert solid support for anti-aggregation and reuse. In order to form metal catalyst of nanoparticles on the inert solid support directly, the process is complicated and the cost is greatly increased.

SUMMARY

Example embodiments provide a metal catalyst manufactured by an electrochemical reduction method.

Example embodiments also provide a manufacturing method for a metal catalyst using by an electrochemical reduction method.

According to one aspect of example embodiments, a metal catalyst manufactured by a method comprises providing a conductor to one side of an insulator, providing a fluid including a metal ion and an electron mediator to the other side of the insulator and providing a voltage to the conductor.

In some embodiments, the metal catalyst may comprise a crystal structure with a miller index of (hkl), and at least one of the h, k and l is more than 2.

In some embodiments, the metal catalyst may have a polygonal shape.

In some embodiments, the metal catalyst may comprise two or more kinds of metals.

In some embodiments, the metal ion may comprise one or more chosen from palladium, gold, platinum, copper, and cobalt.

In some embodiments, the electron mediator may comprise one or more chosen from a hydrogen ion, a hydrogen atom and a hydrogen molecule.

In some embodiments, the fluid may comprise a solution or a gas. The solution may comprise an aqueous solution or an organic solution, and the gas may include hydrogen gas.

In some embodiments, the conductor may comprise a semiconductor or a metal doped by an n-type dopant or a p-type dopant.

In some embodiments, the insulator may be a dielectric layer. The insulator may comprise a semiconductor oxide, a metal oxide, a semiconductor nitride, a metal nitride or a polymer.

In some embodiments, the insulator may have a thickness of about 0.5 nm to about 100 µm.

According to another aspect of example embodiments, a method for manufacturing a metal catalyst comprises providing a conductor to one side of an insulator, providing a fluid including a metal ion and an electron mediator to the other side of the insulator and providing a voltage to the conductor.

In some embodiments, the insulator may comprise a functional group reacting and combining with the metal ion at a surface of the insulator contacting with the solution. The functional group may include an amine group or a sulfur group.

According to another aspect of example embodiments, an electrochemical reduction method comprises providing a conductor to one side of an insulator, providing a fluid including reduction material and an electron mediator to the other side of the insulator and providing a voltage to the conductor.

In some embodiments, the electron mediator may move into the insulator by the voltage and receive electrons from the conductor and provide the electrons to the reduction material.

In some embodiments, the electron mediator may comprise one or more chosen from a hydrogen ion, a hydrogen atom and a hydrogen molecule.

In some embodiments, the fluid may comprise a solution or a gas. The solution may comprise an aqueous solution or an organic solution, and the gas may include hydrogen gas.

In some embodiments, an electric current may flow in the insulator by the voltage, and the size of the electric current may be adjusted by a pH of the solution.

In some embodiments, the conductor may comprise a semiconductor or a metal doped by an n-type dopant or a p-type dopant.

In some embodiments, the insulator may be a dielectric layer. The insulator may comprise a semiconductor oxide, a metal oxide, a semiconductor nitride, a metal nitride or a polymer.

In some embodiments, the insulator may have a thickness of about 0.5 nm to about 100 µm.

According to the embodiments of the present invention, an electrochemical reduction method is a simple process and can save a lot of costs. Moreover, the electrochemical reduction method is eco-friendly because neither a surfactant nor a stabilizer is used, unlike a chemical reduction method. Moreover, a carbon dioxide or oxygen may be reduced by the electrochemical reduction method. Moreover, with a simple process, a metal catalyst can be formed by the electrochemical reduction method. For example, a metal catalyst supported by an insulator, a metal catalyst in a polygonal shape, a metal catalyst having a crystal structure with a miller index of (hkl), in which at least one of the h, k and l are more than 2, and multi-metal catalyst can be formed by the electrochemical reduction method with a simple process. The metal catalyst may be used effectively with a simple process in various fields such as energy technology, pollution protection, and environment purification.

BRIEF DESCRIPTION OF THE DRAWINGS

The above and other objects, features and advantages of the present invention will be more clearly understood from the following detailed description taken in conjunction with the accompanying drawings, in which:

FIG. 10b is a high magnification FESEM image of the Pd—Cu nanocrystal in FIG. 10a;

FIG. 10c is a HAADF-STEM (High Angle Annular Dark Field Scanning Transmission Electron Microscopy) image of the Pd—Cu nanocrystal in FIG. 10a;

FIG. 10d and FIG. 10e are TEM (Transmission Electron Microscopy) images of the Pd—Cu nanocrystals in FIG. 10a; and FIG. 10f illustrates electron diffraction pattern of the Pd—Cu nanocrystals in FIG. 10a.

DESCRIPTION OF SPECIFIC EMBODIMENTS

Hereinafter, a detailed description will be given of embodiments of the present invention. The present invention is not limited to these embodiments and may be embodied in the other forms. The embodiments of the present invention are provided so that thorough and complete contents are ensured and the spirit of the invention is sufficiently transferred to a person having ordinary knowledge in the art.

<Electrochemical Reduction Method Using Electron Mediators>

Figure 1:
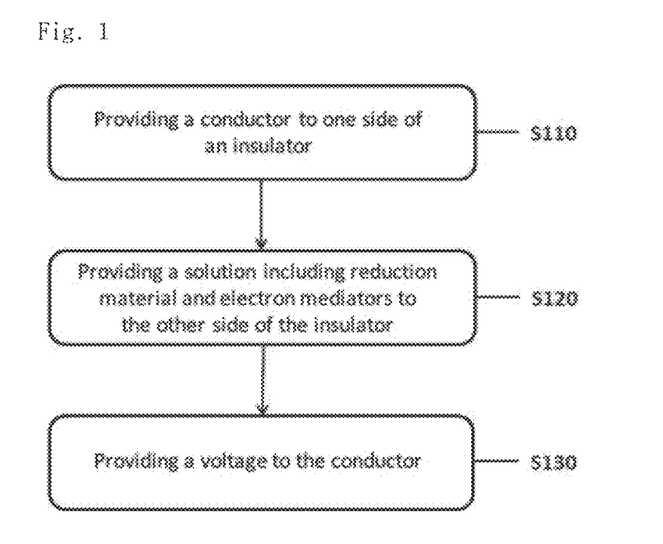
FIG. 1 is a schematic flow chart illustrating an electrochemical reduction method in accordance with embodiments of the present invention.
Figure 2:
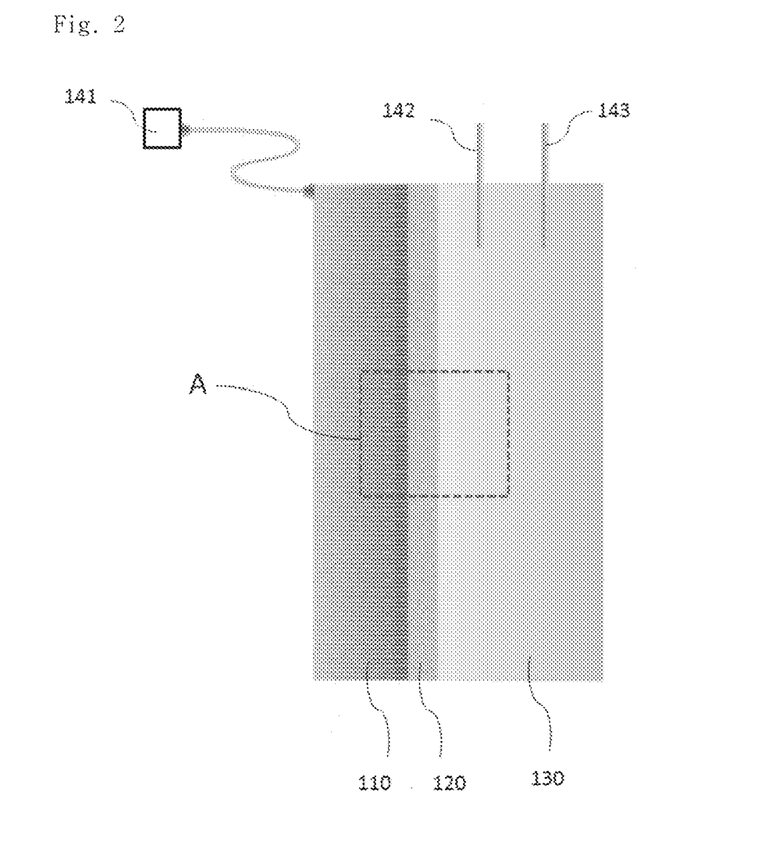
FIG. 2 illustrates the electrochemical reduction method of FIG. 1.
Figure 3:
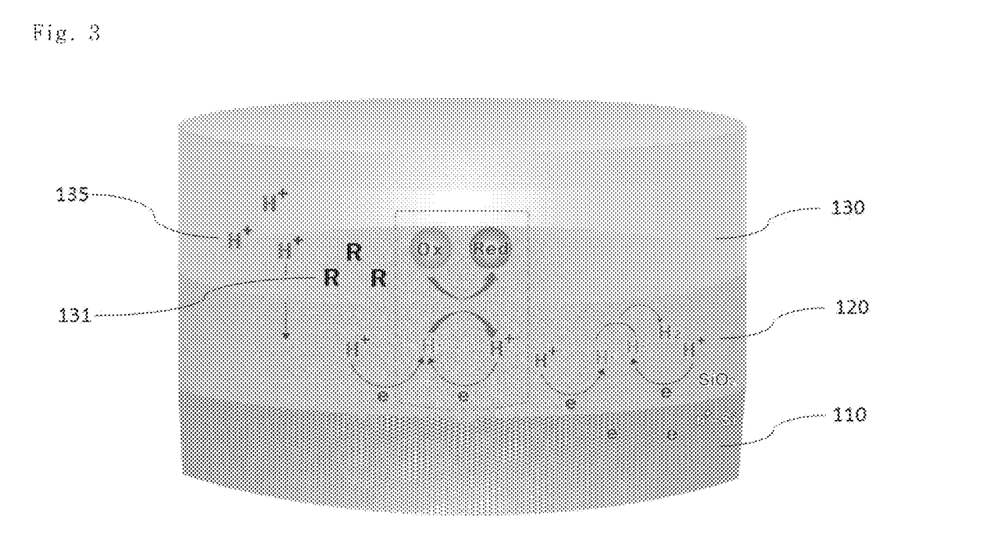
FIG. 3 is an expanded figure of the area 'A' of FIG. 2.

FIG. 1 is a schematic flow chart illustrating an electrochemical reduction method in accordance with embodiments of the present invention. FIG. 2 illustrates the electrochemical reduction method of FIG. 1. FIG. 3 is an expanded figure of the area 'A' of FIG. 2.

Referring to FIG. 1 to FIG. 3, the electrochemical reduction method includes a step S110 of providing a conductor 110 to one side of an insulator 120, a step S120 of providing a solution 130 including reduction material 131 and electron mediators 135 to the other side of the insulator 120, and a step S130 of providing an electrical voltage into the conductor 110.

In the step S110, the conductor 110 is provided to the one side of the insulator 120.

The insulator 120 may be a dielectric layer. The insulator 120 may include a semiconductor oxide, a metal oxide, a semiconductor nitride, a metal nitride, or a polymer. For example, the insulator 120 may include a silicon dioxide or a silicon nitride. The insulator 120 may include a material, which may be permeable to the electron mediators 135 by the voltage provided to the conductor 110. Moreover, the insulator 120 may have a proper thickness, in which the electron mediators 135 permeating by the voltage can function as an electron transfer mediator. The insulator 120 may have various thicknesses according to materials. For example, the insulator 120 may have the thickness of about 0.5 nm to about 100 µm. The insulator 120 may be formed by a thermal oxidation process or an electrochemical oxidation process for the conductor 110.

In the present embodiment, the insulator 120 has a direct contact on the conductor 110. However, a layer or a material may be interposed between the insulator 120 and the conductor 110.

In the step S120, the solution 130 is provided to the other side of the insulator 120. The solution 130 includes the reduction material 131 and the electron mediators 135.

The reduction material 131, for example, may include carbon dioxide or oxygen. The reduction material 131 may include various materials which is not limited with the carbon dioxide or the oxygen.

The electron mediators 135 permeate into the insulator 120 and provides the electrons supplied from the conductor 110 into the reduction material 131 so that the reduction material 131 can be reduced. The electron mediators 135, for example, may be hydrogen ions $H^+$.

The solution 130 may include an aqueous solution or an organic solution. In particular, the solution 130 may include an electrolyte solution. Moreover, a gas may be used instead of the solution 130. For example, the gas may include hydrogen gas The positions of the conductor 110, the insulator 120 and the solution 130 may be changeable. For example, the insulator 120 may be provided on the conductor 110 and the solution 130 may be provided on the insulator 120. Moreover, the conductor 110 having the insulator 120 may be provided into the solution 130.

In the step S130, the voltage is provided to the conductor 110.

The voltage may be provided by a working electrode 141, a reference electrode 142 and a counter electrode 143. The working electrode 141 may be electrically connected to the conductor 110, and the reference electrode 142 and the counter electrode 142 may be electrically connected to the solution 130. Moreover, the working electrode 141, the reference electrode 142 and the counter electrode 143 may be electrically connected to the potentiostat. Otherwise, the conductor 110 may be directly connected on the potentiostat and work as the working electrode. The reference electrode 142 may include Ag/AgCl (in 3M Nacl), and the counter electrode 143 may include a Pt wire of about 0.5 mm diameter.

By the voltage, the hydrogen ions $H^+$, which are the electron mediators 135 in the solution 130, move into the insulator 120 and receive electrons from the conductor 110 so that the hydrogen ions $H^+$ are reduced as hydrogen atoms H. and/or hydrogen molecules $H_2$. The hydrogen atoms H. and/or the hydrogen molecules $H_2$ provide electrons to the reduction material 131 in the solution 130 so that the reduction material 131 is reduced. While the reduction material 131 is reduced, the hydrogen atoms H. and/or the hydrogen molecules $H_2$ are oxidized again as hydrogen ions $H^+$. By the voltage supplied to the conductor 110, the hydrogen ions $H^+$ move into the insulator 120 and are continuously reduced and oxidized in the insulator 120 so that the reduction material is reduced. The hydrogen ions $H^+$, the hydrogen atoms H. and/or the hydrogen molecules $H_2$ in the insulator 120 work as electron transfer mediators transferring electrons from the conductor 110 to the reduction material 131.

When the reduction material 131 is carbon dioxide, ethanol or formic acid may be formed after reduction. When the reduction material 131 is oxygen, water, hydrogen peroxide or hydroxyl ion may be formed after reduction. As mentioned the above, by using the electrochemical reduction method according to the embodiments of the present invention, the carbon dioxide or the oxygen may be reduced, and various compounds may be formed with reducing carbon dioxide production by a simple process.

Figure 4:
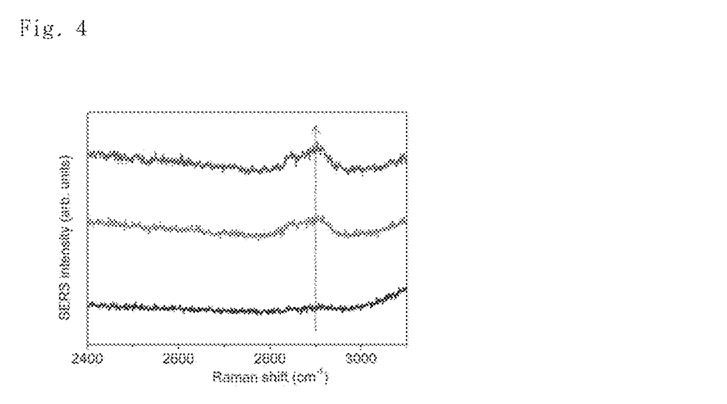
FIG. 4 illustrates a result of Surface Enhanced Raman Scattering analysis for an electron mediator and an insulator in accordance with an embodiment of the present invention.

FIG. 4 illustrates a result of Surface Enhanced Raman Scattering analysis for an electron mediator and an insulator in accordance with an embodiment of the present invention. FIG. 4 illustrates a Surface Enhanced Raman Scattering spectrum which is measured by providing −1.5V voltage to n-type silicon substrate (n-Si/SiO$_2$) when gold micro bead is disposed on a surface of the n-type silicon substrate for the Surface Enhanced Raman Scattering after 0.1M potassium phosphate solution is disposed on the n-type silicon substrate including silicon dioxide of 5 nm thickness.

Referring to FIG. 4, a peak is not shown in the Surface Enhanced Raman Scattering spectrum when the voltage is not supplied to the n-type silicon substrate. Then a peak is shown in the Surface Enhanced Raman Scattering spectrum, at 1 second and 596 seconds after supplying −1.5V voltage to the n-type silicon substrate. Moreover, the peak gets greater according to the passage of the time after the voltage is supplied. The peak is shown at a vibration frequency of about 2905 cm$^-$, which is related to O—H$^+$.

As mentioned the above, when −1.5V voltage is supplied to the n-type silicon substrate, the hydrogen ions or hydrogen atoms move into the silicon dioxide and form Si—(OH$^+$)—Si. The electrons of the n-type silicon substrate may move into an interface between the potassium phosphate solution and the silicon dioxide through the hydrogen atom of the Si—(OH$^+$)—Si. The reduction material in the potassium phosphate solution may be reduced by receiving electrons at the interface.

Figure 5:
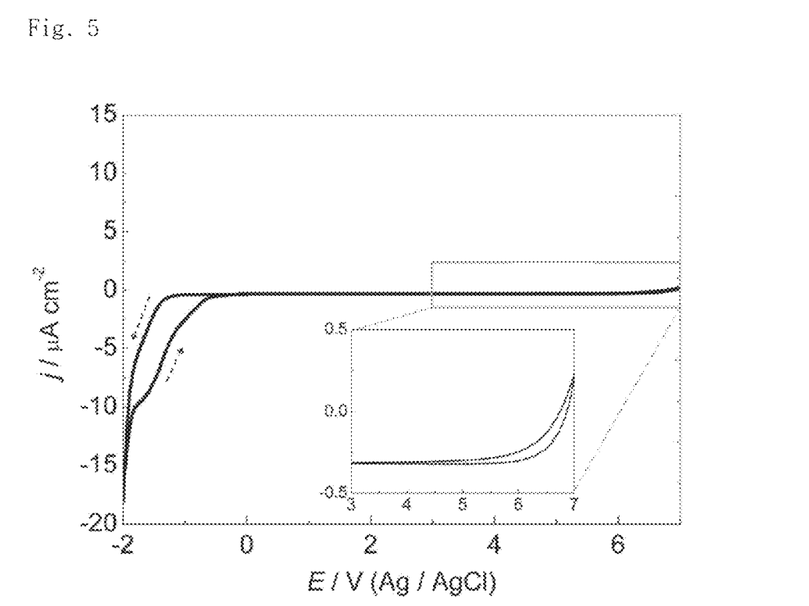
FIG. 5 is a graph illustrating changes of an electric current in an insulator according to a supply voltage.

FIG. 5 is a graph illustrating changes of an electric current in an insulator according to a supply voltage. The graph illustrates a current-voltage curve measured at 10 mV/s of scan speed at a room temperature for a system, which includes a 0.1M potassium phosphate solution of pH 3 having 1 mM Ru(NH$_3$)$_6$Cl$_3$ and Ru(NH$_3$)$_6$Cl$_2$ and an n-type silicon substrate (n-Si/SiO$_2$) having silicon dioxide of 6 nm thickness in the solution. The silicon substrate, which was highly doped by the n-type dopant, was used as the n-type silicon substrate.

Referring to FIG. 5, the current-voltage curve illustrates asymmetrically. The asymmetry means the difference of the flow of the electrons, which is the flow of the electric current through the silicon dioxide. When the negative voltage is provided, the amount of the hydrogen ions moving into the silicon dioxide is different from when the positive voltage is provided.

When the negative voltage is provided to a system, the hydrogen ions in the potassium phosphate solution move into the silicon dioxide and absorb electrons from the n-type silicon substrate, and provides the electrons to the Ru(NH$_3$)$_6$$^{3+}$ in the potassium phosphate solution so that the Ru(NH$_3$)$_6$$^{3+}$ is reduced. When the negative voltage is provided to the system, the hydrogen ions in the potassium phosphate solution work as electron mediators, thus easily reducing the Ru(NH$_3$)$_6$$^{3+}$ in the potassium phosphate solution because the electrons flow well even with a small negative voltage. However, when the positive voltage is provided to the system, very high positive voltage should be provided in order to oxidize the Ru(NH$_3$)$_6$$^{3+}$ in the potassium phosphate solution because it is hard for the hydrogen ions to move to the silicon dioxide and work as the electron mediators.

As mentioned the above, when the negative voltage is provided to the system, the hydrogen ions can move to the silicon dioxide and be accumulated easier than when the positive voltage is provided to the system. The hydrogen ions, which move to the silicon dioxide and are accumulated, transfer the electrons absorbed from the n-type silicon substrate to the reduction material in the potassium phosphate solution so as to reduce the reduction material.

Figure 6:
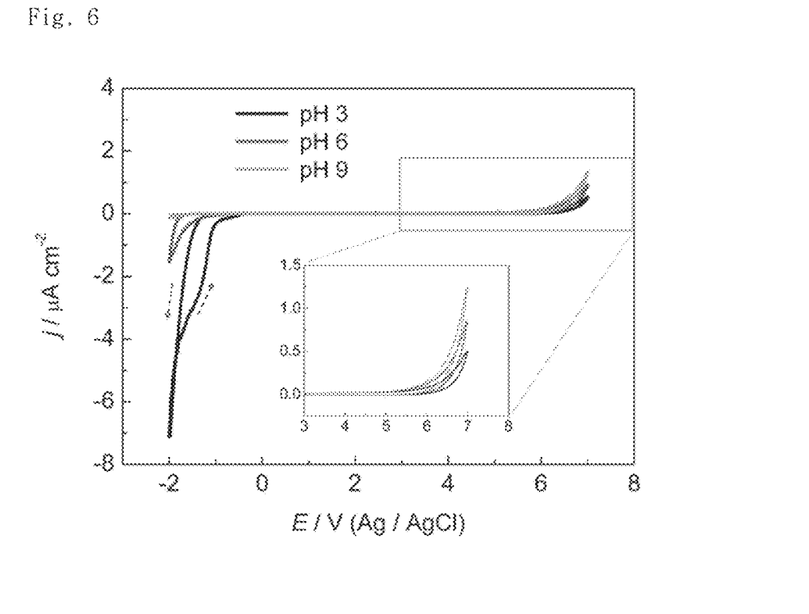
FIG. 6 is a graph illustrating changes of an electric current in an insulator according to a pH of a solution.
Figure 7:
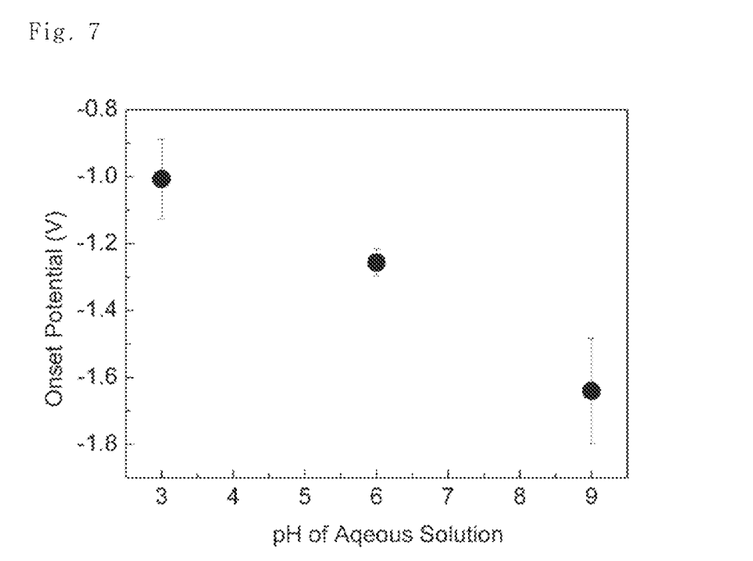
FIG. 7 is a graph illustrating changes of an onset voltage according to a pH of a solution.

FIG. 6 is a graph illustrating changes of an electric current in an insulator according to a pH of a solution. FIG. 7 is a graph illustrating changes of an onset voltage according to a pH of a solution. The graph illustrates a current-voltage curve measured at 10 mV/s of scan speed at a room temperature when the pH of a 0.1M potassium phosphate solution is changed to 3, 6, and 9 respectively. The onset voltage is defined as a voltage when a current density is a 30% of a base current.

Referring to FIG. 6 and FIG. 7, the amount of the current is increased as the pH of the solution is decreased, and the onset voltage is shown at the smaller negative voltage. Thus, when the acidity of the solution is stronger, the current can flow through the silicon dioxide with the smaller voltage so that the reduction material can be reduced. By adjusting the pH of the solution, the amount of the current can be controlled, and the amount of voltage can be controlled.

<Method for Manufacturing Metal Catalyst Using the Electrochemical Reduction Method and the Metal Catalyst Manufactured By the Method>

Figure 8:
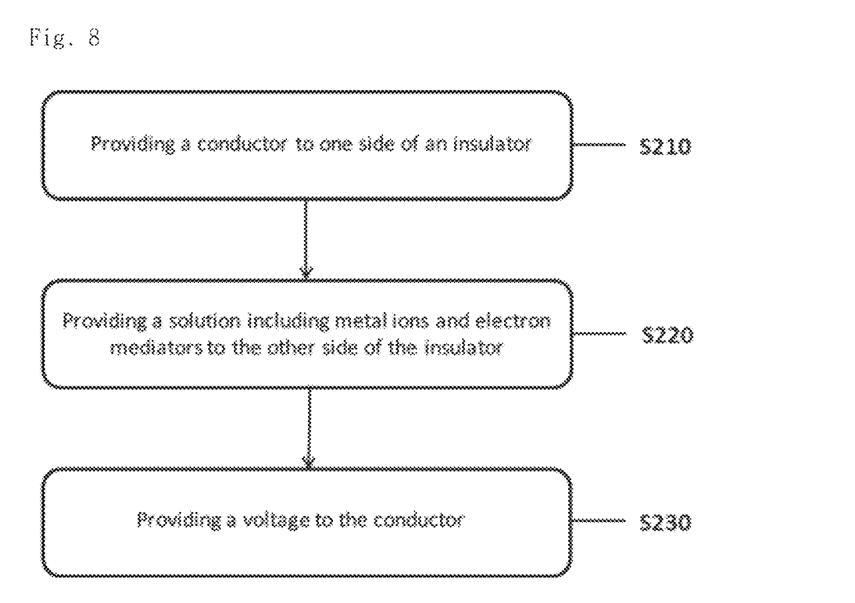
FIG. 8 is a schematic flow chart illustrating a method for manufacturing a metal catalyst in accordance with embodiments of the present invention.
Figure 9:
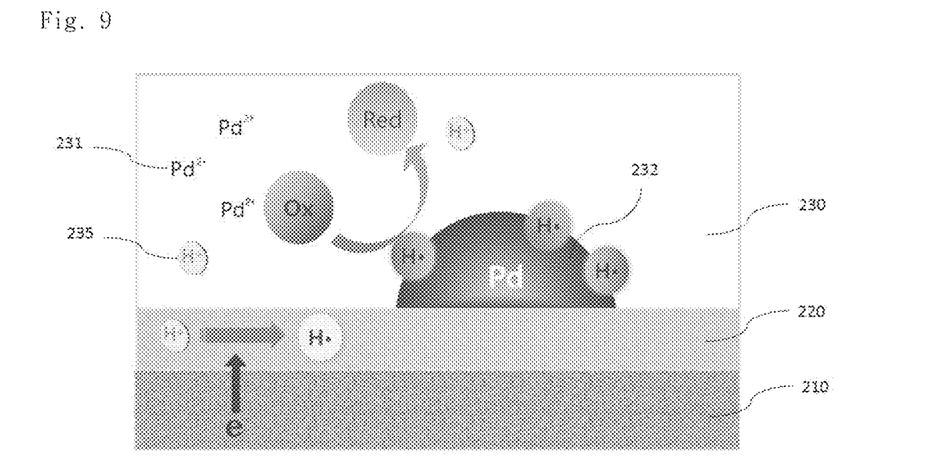
FIG. 9 illustrates the method for manufacturing the metal catalyst in FIG. 8.

FIG. 8 is a schematic flow chart illustrating a method for manufacturing a metal catalyst in accordance with embodiments of the present invention. FIG. 9 illustrates the method for manufacturing the metal catalyst in FIG. 8.

Referring to FIG. 8 and FIG. 9, the electrochemical reduction method includes a step S210 of providing a conductor 210 to one side of an insulator 220, a step S220 of providing a solution 230 including metal ions 231 and electron mediators 235 to the other side of the insulator 220, and a step S230 of providing an electrical voltage into the conductor 210.

In the step S210, the conductor 210 is provided to the one side of the insulator 220.

The conductor 210 may include silicon or metal doped by an n-type dopant or a p-type dopant. For example, the conductor 210 may include silicon doped by the n-type dopant.

The insulator 220 may be a dielectric layer. The insulator 220 may include a semiconductor oxide, a metal oxide, a semiconductor nitride, a metal nitride or a polymer. For example, the insulator 220 may include a silicon dioxide or a silicon nitride. The insulator 220 may include a material, which may be permeable to the electron mediators 235 by the voltage provided to the conductor 210. Moreover, the insulator 220 may have a proper thickness, in which the electron mediators 235 permeating by the voltage can function as an electron transfer mediator. The insulator 220 may have various thicknesses according to materials. For example, the insulator 120 may have the thickness of about 0.5 nm to about 100 μm. The insulator 220 may be formed by a thermal oxidation process or an electrochemical oxidation process for the conductor 210.

In the present embodiment, the insulator 220 has a direct contact on the conductor 210. However, a layer or a material may be interposed between the insulator 220 and the conductor 210.

In the step S220, the solution 230 is provided to the other side of the insulator 220. The solution 230 includes the metal ions 231 and the electron mediators 235.

The metal ions 231, for example, may include one or more chosen from palladium ion, gold ion, platinum ion, copper ion, and cobalt ion. The metal ions 231 may include various ions which is not limited as mentioned the above.

The electron mediators 235 permeate into the insulator 220 and provide the electrons supplied from the conductor 210 into the metal ions 231 so that the metal ions 231 can be reduced. The electron mediators 235, for example, may be hydrogen ions $H^+$.

The solution 230 may include an aqueous solution or an organic solution. In particular, the solution 230 may include an electrolyte solution. Moreover, a gas may be used instead of the solution 230. For example, the gas may include hydrogen gas.

The positions of the conductor 210, the insulator 220 and the solution 230 may be changeable. For example, the insulator 220 may be provided on the conductor 210 and the solution 230 may be provided on the insulator 220. Moreover, the conductor 210 having the insulator 220 may be provided into the solution 230.

In the step S230, the voltage is provided to the conductor 210.

The voltage may be provided by a working electrode, a reference electrode and a counter electrode, which are not shown in the figures related to the present embodiment. The working electrode may be electrically connected to the conductor 210, and the reference electrode and the counter electrode may be electrically connected to the solution 230. Moreover, the working electrode, the reference electrode and the counter electrode may be electrically connected to a potentiostat (not shown).

By the voltage, the hydrogen ions $H^+$, which are the electron mediators 235 in the solution 230, move into the insulator 220 and receive electrons from the conductor 210 so that the hydrogen ions $H^+$ are reduced as hydrogen atoms H. and/or hydrogen molecules (not shown). The hydrogen atoms H. and/or the hydrogen molecules provides electrons to the metal ions 231 in the solution 230 so that the metal ions 231 are reduced. While the metal ions 231 are reduced, the hydrogen atoms H. and/or the hydrogen molecules are oxidized again as hydrogen ions $H^+$. By the voltage supplied to the conductor 210, the hydrogen ions $H^+$ move into the insulator 220 and are continuously reduced and oxidized so that the metal ions 231 are reduced. The hydrogen ions $H^+$, the hydrogen atoms H. and/or the hydrogen molecules in the insulator 220 work as electron transfer mediators transferring electrons from the conductor 210 to the metal ions 231.

The metal ions 231 may be reduced and form a metal catalyst 232 on a surface of the insulator 220. The metal catalyst 232 may be adhered to the surface of the insulator 220 and be supported by the insulator 220. The metal catalyst 232 may be formed as a nanoparticle or a nanocrystal. Moreover, the metal catalyst 232 may have a crystal structure with a miller index of (hkl), and at least one of the h, k and l is more than 2, and the metal catalyst 232 may have a polygonal shape. Thus, the metal catalyst 232 may have an excellent catalytic activity.

The insulator 220 may include a functional group, which can react and combine with the metal ions 231, at the surface contacting with the solution 230. The functional group may include an amine group or a sulfur group. The metal catalyst 232 is more strongly adhered and combined to the surface of the insulator 220 by the functional group.

The metal ions 231, for example, may include palladium ions $Pd^{2+}$. The palladium ions $P^{2+}$ are reduced by the hydrogen atoms H. and/or the hydrogen molecules in the insulator 220 so that a palladium particle or a palladium crystal may be formed on the surface of the insulator 220. The hydrogen atoms H. and/or the hydrogen molecules in the insulator 220 move to the surface of the palladium particle or crystal, and the reduction of the palladium ions $P^{2+}$ keeps to proceed at the surface. Thus, the palladium particle or crystal grows so that the palladium catalyst Pd can be formed.

When the solution 230 may include two or more kinds of metal ions 231, a multi-metal catalyst 232 may be formed. For example, when the solution 230 includes palladium ions $Pd^{2+}$ and copper ions $Cu^{2+}$, the palladium ions $Pd^{2+}$ are reduced and the palladium particle or crystal, which has more strong bonding force with the insulator 230, is formed on the surface of the insulator 220. The copper ions $Cu^{2+}$ are reduced by the hydrogen atoms H. and/or the hydrogen molecules, which moved from the insulator 220 to the surface of the palladium particle or crystal. Thus, the bimetal catalyst 232 with palladium and copper may be formed.

In the present embodiment, the metal catalyst 220 is formed at the surface of the insulator 220. However, the position for forming the metal catalyst 220 is not limited to the surface of the insulator 220. The metal catalyst 220 may be formed in the solution 230. For example, the metal catalyst such as Cu nanoparticles, may be formed in the solution 230.

Figure 10A:
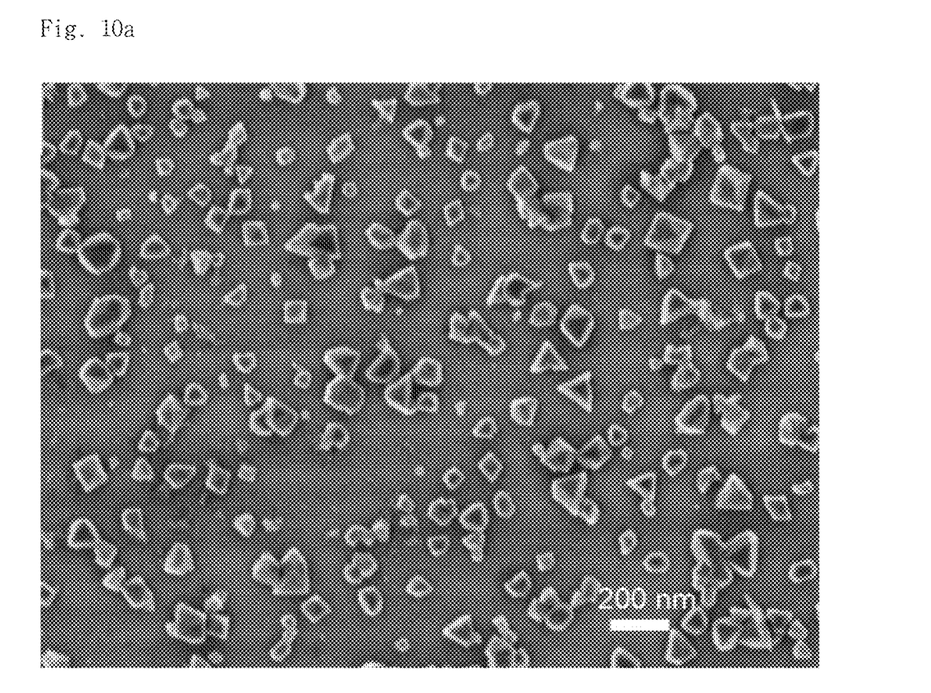
FIG. 10a is a FESEM (Field Emission Scanning Electron Microscopy) image of a Pd—Cu nanocrystal manufactured and supported by the silicon dioxide in accordance with embodiments of the present invention.
Figure 10B:
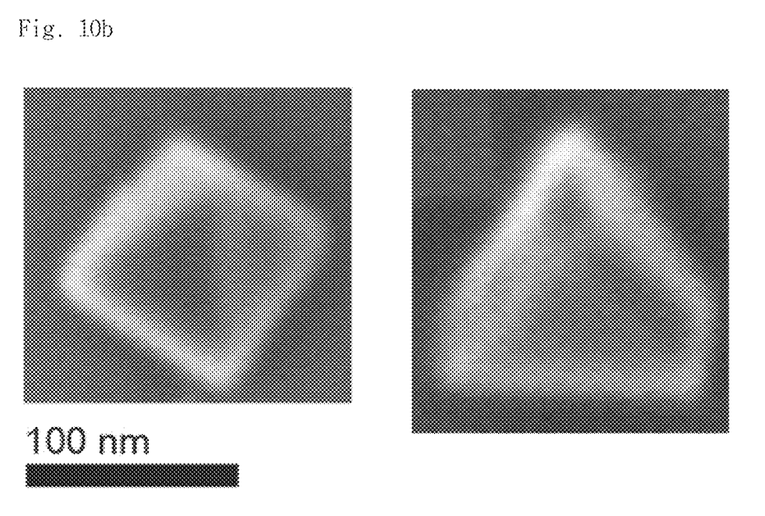
Figure 10C:
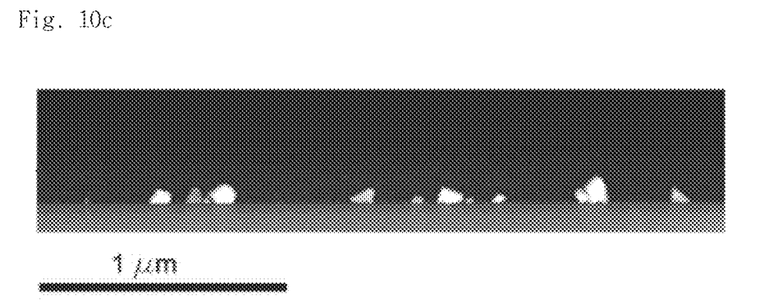
Figure 10D:
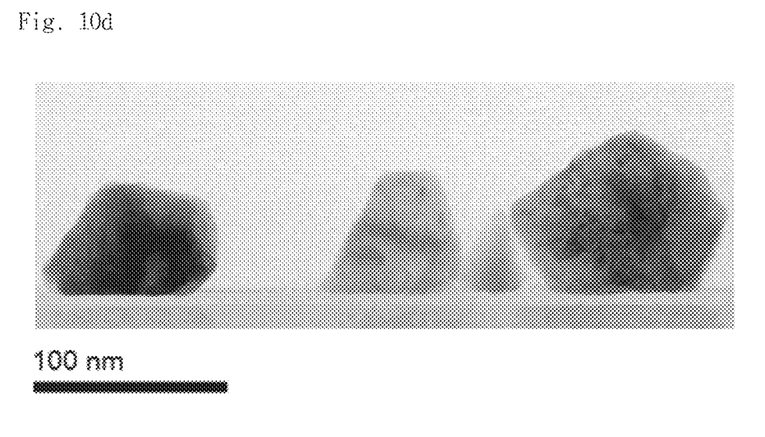
Figure 10E:
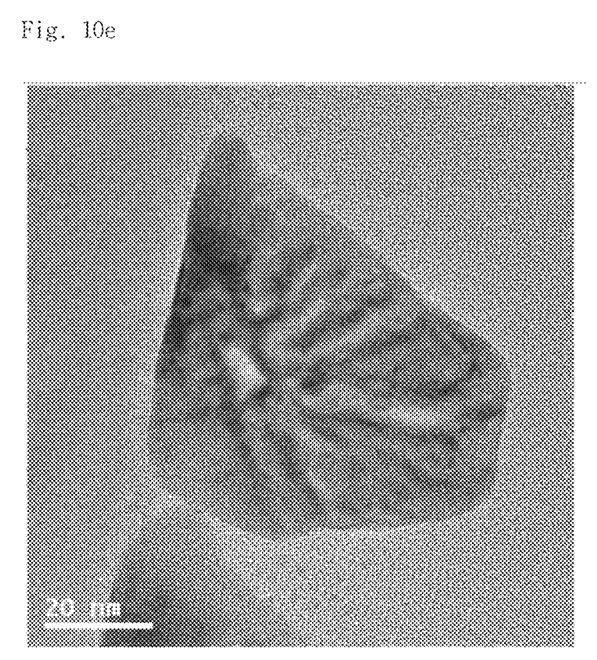
Figure 10F:
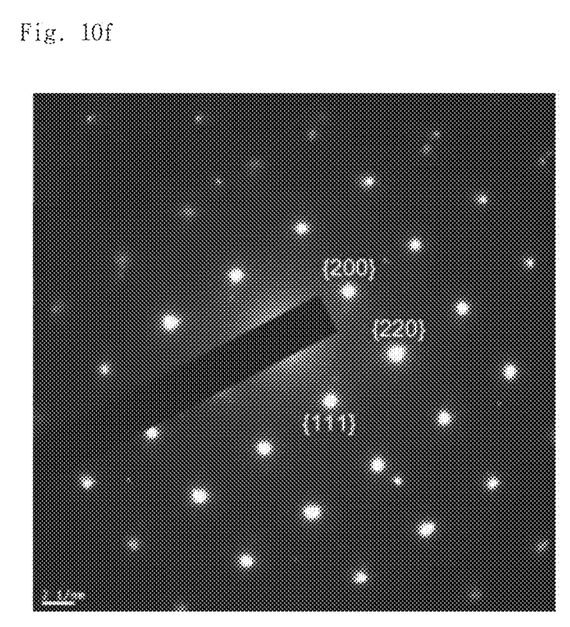

FIG. 10a is a FESEM image of a Pd—Cu nanocrystal manufactured and supported by the silicon dioxide in accordance with embodiments of the present invention. FIG. 10b is a high magnification FESEM image of the Pd—Cu nanocrystal in FIG. 10a. FIG. 10c is a HAADF-STEM image of the Pd—Cu nanocrystal in FIG. 10a. FIG. 10d and FIG. 10e are TEM images of the Pd—Cu nanocrystal in FIG. 10a. FIG. 10f illustrates electron diffraction pattern of the Pd—Cu nanocrystal in FIG. 10a.

The Pd—Cu nanocrystal is formed by providing −1.3V constant voltage during 30 minutes when the n-type silicon substrate is dipped in 0.1M $H_2SO_4$ solution including 1 mM $CuSO_4$ after providing —1.2V constant voltage during 30 minutes to the n-type silicon substrate having the silicon dioxide in 0.1M potassium phosphate solution of pH 3 including 1 mM $PdCl_2$.

Referring to FIG. 10a to FIG. 10f, the Pd—Cu nanocrystal may have a polygonal shape such as an octahedron or a triangular prism. Moreover, the Pd—Cu nanocrystal may have a crystal structure, the miller index of which is (hkl), and at least one of h, k and l are more than 2.

As mentioned the above, according to the embodiments of the present invention, a multi-metal catalyst as well as a single metal catalyst can be formed at a room temperature by an electrochemical reduction method, which is simple process. Moreover, the metal catalyst is supported by an insulator or separated from the insulator, and can be used simply and effectively in the various field such as an energy technique, pollution prevention and environment purification.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method, comprising:
   providing a conductor to one side of an insulator;
   providing a fluid including reduction material and an electron mediator to the other side of the insulator;
   providing a voltage to the conductor; and
   wherein the electron mediator moves into the insulator by the voltage.

2. The method of claim 1,
wherein the electron mediator receives electrons from the conductor and provides the electrons to the reduction material.

3. The method of claim 1,
wherein the electron mediator is selected from the group consisting of one or more of a hydrogen ion, a hydrogen atom and a hydrogen molecule.

4. The method of claim 1,
wherein the fluid comprises a solution or a gas,
the solution comprises an aqueous solution or an organic solution, and
the gas comprises hydrogen gas.

5. The method of claim 4,
wherein an electric current flows in the insulator by the voltage, and
the size of the electric current is adjusted by a pH of the solution.

6. The method of claim 1,
wherein the conductor comprises a semiconductor or a metal doped by an n-type dopant or a p-type dopant.

7. The method of claim 1,
wherein the insulator is a dielectric layer, and
the insulator comprises a semiconductor oxide, a metal oxide, a semiconductor nitride, a metal nitride or a polymer.

8. The method of claim 1,
wherein the insulator has a thickness of about 0.5 nm to about 100 μm.

* * * * *